S. RUBEN.
METHOD OF AND APPARATUS FOR PROMOTING CHEMICAL REACTIONS BETWEEN GASES.
APPLICATION FILED APR. 16, 1920.
1,431,047.
Patented Oct. 3, 1922.
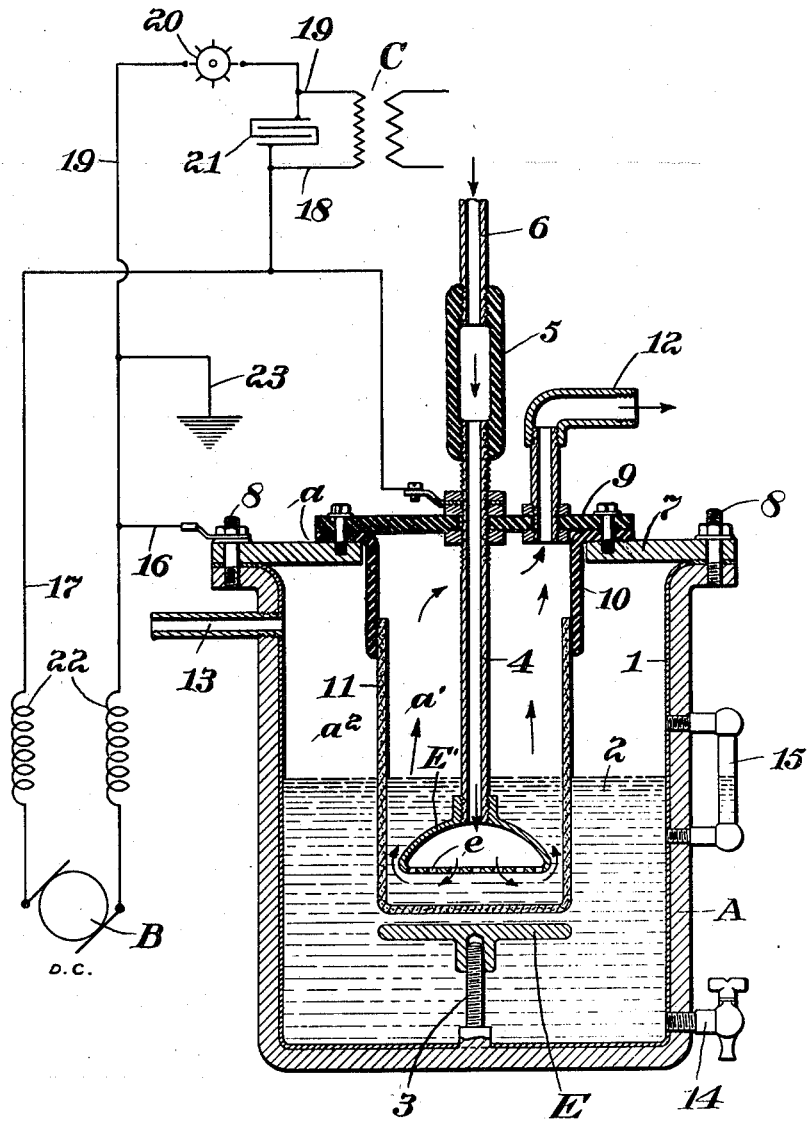
Inventor:
Samuel Ruben,
by Robert Watson
Atty.

Patented Oct. 3, 1922.

1,431,047

UNITED STATES PATENT OFFICE.

SAMUEL RUBEN, OF NEW YORK, N. Y.

METHOD OF AND APPARATUS FOR PROMOTING CHEMICAL REACTIONS BETWEEN GASES.

Application filed April 16, 1920. Serial No. 374,420.

*To all whom it may concern:*

Be it known that I, SAMUEL RUBEN, a citizen of the United States, residing at 70 East 93rd Street, New York city, in the county of New York and State of New York, have invented certain new and useful Improvements in Methods of and Apparatus for Promoting Chemical Reactions Between Gases, of which the following is a specification.

This invention relates to a method of and apparatus for promoting chemical reactions between gases, or between a gas and vapor. In carrying out the invention, I provide a suitable vessel containing a conductive liquid, and means for liberating a gas within the liquid, either by electrolysis or by chemical reaction, in the immediate presence of another gas or vapor which is introduced into or generated within the liquid, and a high frequency electric current, of high current density, is simultaneously passed through the liquid. This latter current causes ionization of the active atoms of the liberated gases and thereby promotes a reaction between the gases. The ionization of the active gas particles is brought about, directly, by the action of the high frequency current upon the atoms, and also, indirectly, by the action of said current in setting the ions in the liquid into vibration, in accordance with the frequency of the current, these ions, by collisions with the active atoms of the gas, causing further ionization of the latter.

Where electrolysis is relied upon for the generation of the active gases, a direct current is passed through the liquid between electrodes submerged therein, for the purpose of decomposing the liquid, and a high frequency current, for causing ionization of the gas, is superposed upon the direct current by connecting the same electrodes to a source of high frequency current. A porous partition separates the gases evolved at the electrodes, and a gas or vapor with which the active gases liberated at the negative electrode may combine, is introduced into the liquid by mechanical means or evolved therein by chemical means adjacent said electrode. Where the active gas is evolved within the liquid by chemical reaction instead of by electrolysis, of course the electrodes are connected only to the high frequency current source.

In the accompanying drawing, I have shown an apparatus suitable for carrying out the invention by electrolytic means, the electrical circuits being shown diagrammatically.

Referring to the drawing, A indicates a suitable vessel, which may be of iron, having an internal lining 1, to protect the metal against the oxidizing effect of the gases, the vessel being adapted to hold an electrolyte 2, which may be water made slightly conductive by the addition of a suitable acid or salt. Upon a threaded spindle 3, projecting upward from the bottom of the vessel A, is arranged an electrode E, which is adjustable upon and removable from the spindle. Above this electrode is arranged another electrode E', the latter being supported at the lower end of a tube 4, which extends through the top of the casing and is connected by an insulating joint or coupling 5 with a pipe 6, through which gases or vapors may be delivered to the tube 4 and thence to the electrode E'. This electrode, as shown in the drawing, is in the form of a bell having a perforated lower wall $e$, opposed to the electrode E. Gases or vapors entering the liquid through tube 4 will flow in close contact with the lower wall and thence around the lower edges of the bell before passing upward through the liquid to the space above. The vessel A is provided with a top $a$, composed of an annular part 7, which may be of metal and suitably secured by screws 8 to the vessel, and a central part 9, which is composed of some suitable insulating material, such as baked lava. Between the parts 7 and 9 is secured a sleeve 10, which extends downwardly within the container and supports a porous cup 11, which extends into the liquid, and forms a partition between the electrodes E and E'. This partition divides the interior of the vessel A into two compartments, $a'$ and $a^2$, and prevents the intermingling of the gases evolved at the two electrodes. A pipe 12 connects the compartment $a'$ with a suitable exhaust pump, not shown, and when the apparatus is in operation the exhaust pump causes gas or vapor, as the case may be, to flow into the compartment $a'$, through the pipe 6 and past the electrode E' and thence outward through the pipe 12. The compartment $a^2$ of the vessel A is provided with a pipe 13, through which gases evolved at the electrode E may escape, and with a fitting 14, by means of which liquid may be admitted to or withdrawn from the vessel, and also with a suitable gage 15, by which the height of the liquid in the vessel may be ascertained.

A wire 16 connects the metal shell of the vessel A with one terminal of a direct current generator B, and the other terminal of said generator is connected by conductor 17 with the tube 4, as shown. Since the electrode E is connected to the shell of the vessel or container and the electrode E' is connected to the tube 4, it will be evident that the current from the direct current generator will flow through the liquid from one electrode to the other and that, assuming the electrode E' to be the negative electrode, hydrogen gas will be liberated at said electrode, and the gas introduced through the pipe 6 will be brought into intimate contact with the hydrogen gas at the surface of the electrode. These gases while in the liquid are acted upon by a high frequency current which should also be of high amperage. In the drawing, I have shown a means for producing a high frequency current of high current density, consisting of a suitable alternating current source C, one terminal of which is connected by conductor 18 to conductor 17 and thence to the tube 4 and electrode E', and the other terminal of the alternating current source being connected by conductor 19, through a spark gap device 20, to conductor 16 which leads to the electrode E through the wall of the vessel A. A condenser 21 is connected to the conductors 18 and 19 and discharges a heavy oscillating current through the liquid each time the circuit is established through the spark gap device. In order to prevent this high frequency current from discharging through the direct current generator suitable inductive resistances 22 are placed in circuit with the latter generator. The vessel A is also grounded as shown by the ground wire 23, which is connected through conductors 19 and 16 to the vessel.

As a practical illustration of the operation of the apparatus, assuming that the high frequency and direct currents are applied to the liquid, nascent hydrogen will be liberated at the negative electrode E', by the decomposing action of the direct current, and if carbon monoxide (CO) be caused to flow through the chamber $a'$ it will be brought into intimate contact with the hydrogen at the lower surface of the electrode, and a reaction will take place under the influence of the high frequency current, resulting in the formation of formaldehyde, which passes off through the pipe 12.

By reversing the polarity of the direct current oxygen will be evolved at the surface of the electrode E'. Various reactions are possible, according to the gas or vapor introduced, and the direction of flow of the direct current. Where, for instance, more efficient hydrogenation or oxidation of a gas is desired, the gas will be introduced through the electrode E' and the polarity of the direct current will be changed, according to whether oxygen or hydrogen is to be evolved at the electrode E.

What I claim is:

1. The method of promoting a reaction between gaseous fluids which comprises causing the fluids to be brought into contact with one another in a conductive liquid and passing a high frequency current through the liquid.

2. The method of promoting a reaction between gaseous fluids which comprises causing the fluids to be brought into contact with one another in a conductive liquid and passing a high frequency current of high current density through the liquid.

3. The method of promoting a reaction between gaseous fluids which comprises introducing a gaseous fluid into a conductive liquid, causing the liberation of another gaseous fluid in said liquid, and passing a high frequency current through the liquid.

4. The method of promoting a reaction between gaseous fluids which comprises introducing a gaseous fluid into a conductive liquid, causing the liberation of another gaseous fluid in said liquid by electrolysis, and passing a high frequency current through the liquid.

5. The method of promoting a reaction between gaseous fluids which comprises introducing a gaseous fluid into a conductive liquid in proximity to an electrode, causing another gaseous fluid to be liberated at the surface of said electrode by electrolysis, and passing a high frequency current through said electrode and liquid.

6. In an apparatus for the purpose described, a vessel containing a conductive liquid, electrodes in said liquid, direct and high frequency electric current sources connected to said electrodes, a porous partition between said electrodes, and means for drawing gaseous fluid through said conductive liquid in contact with one of said electrodes.

7. In an apparatus for the purpose described, a vessel containing a conductive liquid, a porous partition dividing said vessel into two compartments, electrodes in said compartments, one of said electrodes having an opening therethrough, a pipe connected to said latter electrode, means for drawing gaseous fluids through the compartment containing said latter electrode by way of said pipe, and direct and high frequency electric current sources connected to said electrodes.

In testimony whereof I affix my signature.

SAMUEL RUBEN.